United States Patent [19]

Schmidt

[11] Patent Number: 4,769,941
[45] Date of Patent: Sep. 13, 1988

[54] DEVICE FOR HOLDING FISHING LURES

[76] Inventor: Donald L. Schmidt, 2412 St. Mary's, Midland, Mich. 48640

[21] Appl. No.: 152,244

[22] Filed: Feb. 4, 1988

[51] Int. Cl.⁴ .................................. A01K 97/06
[52] U.S. Cl. ...................................... 43/57.1
[58] Field of Search .............. 43/57.1, 57.2, 54.1; 206/315.11; 224/920

[56] References Cited

U.S. PATENT DOCUMENTS

| | | | |
|---|---|---|---|
| 2,081,817 | 5/1937 | Johnson | 43/57.2 |
| 2,743,546 | 5/1956 | Crist | 43/54.1 |
| 2,789,389 | 4/1957 | Moen | 43/57.2 |
| 2,924,908 | 2/1960 | Lisowy | 206/315.11 X |
| 4,563,834 | 1/1986 | Spencer | 43/57.1 |

FOREIGN PATENT DOCUMENTS 2004171A 3/1979 United Kingdom ................. 43/57.1

*Primary Examiner*—Nicholas P. Godici
*Assistant Examiner*—J. Reed Batten, Jr.
*Attorney, Agent, or Firm*—Robert L. McKellar

[57] ABSTRACT

A tubular casing having a circular-cylindrical inside surface contains and engages a hollow cylindrical elastomeric annulus under compression. The casing has vertical elongated openings which correspond to and align with slits through the annulus to accept the hook of a fishing lure. At least one casing-annulus device may be detachably fixed within a case.

3 Claims, 2 Drawing Sheets

DEVICE FOR HOLDING FISHING LURES

The instant invention deals with a device for securing and storing fishing lures such that they are easily and readily accessible to the fisherman.

When practicing the art of sports fishing, many different lures equipped with hooks are commonly carried by the fisherman. It is highly desirable that these lures be kept in such a manner that the fisherman, while fishing, may easily find the desired lure without losing or disturbing the remainder of the stored lures.

To accomplish this objective, the lures must be organized and secured in such a manner that they may be easily seen, retrieved, and later returned to their place of storage. Generally, when numerous lures are stored, they tend to be dislodged by jarring or when they are inadvertently touched by the fisherman while being retrieved or returned. They thus become mixed, tangled together, or lost by falling out of the container. By means of the present invention these latter problems are solved.

BACKGROUND OF THE INVENTION

Various types of devices are known for storing small items. Generally, the devices are in the form of small boxes containing bins or trays, or covered compartments and the means for holding the small items take the form of closed cell, resilient foams or cork which accept a portion of the small item and hold it by frictional hold, or the small item is held by pins or clips, or the small item may be held by coiled springs or the like, or, the small item can be held by puncturing a soft foamed plastic substrate with a sharp part of the small item. A favorite holding device is the use of soft resilient foams and the like which have been pre-slit to accommodate a portion of the small item. Some of these devices depend on the frictional hold of a portion of the item in order to keep them in the storage device. Typically, these prior art storage devices are formed such that a portion of the item to be stored is slipped into a preformed slot in a cover layer and anchored in a flexible, resilient material laying underneath the slot. Thus, U.S. Pat. No. 1,482,678, to Figley issued on Feb. 5, 1924, describes a fisherman's dry flyleaf book type of storage device. The device depends on combs containing vertical slit teeth which are aligned with slots in an overleaf. The vertical teeth are designed to accommodate the hook portion of an artificial fly such that when the fly in inserted into the teeth, the teeth slit is forced apart which creates tension on the hook and holds it in place. The problem with this type of device is that after a short period of time, the teeth are "sprung" and the flys are not held tightly and they tend to come loose inside the container.

A second type of device is the device described in Jacqmein, U.S. Pat. No. 1,815,568, which issued July 21, 1931, in which slit cork rods are held by metal channels inside a container. At column 2, of page 2, of the specification, the inventor describes the manufacture of the cork strips in the channels and the inventor herein wishes to note for those skilled in the art, that the "compression" described therein is strictly for the anchoring of the cork strip in the metal channel and has nothing to do whatsoever with any compression forces associated with the insertion of an item into the slits of the cork holder. The significance of this point will be better understood with an entire reading of this specification and claims.

A further small item holder is described in the U.S. Pat. No. 2,119,832, issued June 6, 1938, to M. J. Schless. This holder is similar to the holder of Figley, in that clamping teeth are required to hold the small item. Thus, this type of device suffers from the same problem as is found in Figley, namely, that the teeth lose their tenacity to hold the item in place.

Trujillo, in U.S. Pat. No. 2,814,152, issued Nov. 26, 1957, describes a rotary fly container. in which multiple lengthwise grooves in a tube are surmounted on either side by tubular elastic grips held by metal channels. The rotary device is also claimed as a flashlight. It appears from the specification and the drawings in this reference that the hook of a fly is forced between the lengthwise tubular elastic grips. which causes the tubes to be forced apart and which results in a frictional hold on the hook. The force holding the hook is thus supplied by the attempt of the tubes to return to their normal configuration. However, if a hook is moved back and forth several times in the lengthwise direction, the hook falls out.

U.S. Pat. No. 3,753,519, issued Aug. 21, 1973, deals with a golf accessory carrier designed to hold golf tees, markers and the like. This device operates by forcing the item desired to be stored, into a resilient compressable core of a boxlike configuration. Thus, a hole is formed by the insertion and a pressure is exerted on the item to be held by virtue of the desire of the flexible material to return to its original configuration. Both U.S. Pat. Nos. 4,181,224, and 4,350,249 deal with apparatus for holding pieces of jewelry and both operate by the insertion of a sharp piece of the jewelry into a flexible material, or by the insertion of a holder device in a soft flexible material. Thus, both of these devices operate on the principle that soft flexible material is forced aside and the desire of the material to return to its original configuration is the force that holds the item in device.

Finally. the most pertinent reference appears to be the U.S. Pat. No. 2,797,806, issued on July 2, 1957, which describes a jewelry case designed to have the appearance of a closed book. Said device has a boxlike structure which contains in the bottom of the box, soft resilient foamed material which is described by the inventor therein as a foam rubber body. which is designed such that the body has a series of spaced apart longitudinally extending, square-section voids, spaced inwardly from both the top and the bottom of said body. The body is provided with parallel slits extending inward from the surface of said body and communicating with each void intermediate its width. The inventor states that it is preferable that the flanges or tops which overlie the voids should be in engagement at the slit portions so as to have pressure engagement with the shanks of the jewelry which is passed through said slits and into the voids. It is important for those skilled in the art to realize that the pressure that holds the jewelry in the slot is wholly dependent on the flanges or tops which overlie the voids, and which is pushed apart by the insertion of the jewelry, and which obtains its force by virtue of the need for the foam rubber to return to its original configuration. If this device were used to hold hooks, movement of the hook in the direction of the slit causes the hook to dislodge. The instant invention depends in part on such a force, but there are also present additional forces, created when the device of the instant invention is manufactured, and which are not present in the prior art devices.

The prior art devices, especially those with resilient fillers, are thus not wholly satisfactory for storing fishing lures in that they are impractical for use while being used during fishing, or they simply do not function sufficiently to hold the small items in their place while the device is being actively used. Furthermore, it has been found that none of the prior art devices will function for heavy lures such as plugs or spoons rigged with treble or even larger single hooks. After repeated usage, many of these devices fail to hold even small hooks.

The present inventive device overcomes the aforementioned problems because of its unique ability to hold the small items more securely while not creating impractical removal, use and re-insertion of the small item into the inventive device.

SUMMARY OF THE INVENTION

The instant invention comprises a device for holding and storing fishing lures comprising in combination (i) a tubular casing having a circular-cylindrical inside surface;

(ii) said tubular casing containing and engaging a hollow circular-cylindrical elastomeric annulus held under a slight triaxial compression by said tubular casing;

(iii) said tubular casing having, with respect to the long axis of the tubular casing, essentially vertical elongated openings through its walls and, slits through the elastomeric annulus corresponding to and aligning with said elongated openings.

A second feature of the instant invention, is an arrangement of the device, or several of the devices, in a case so that storage space for many lures can be provided. Such an arrangement also provides a means for the carrying of the inventive devices such that both the lures and device may be easily removed and returned to storage.

A third feature of the instant invention, is a means for detachedly affixing the device to fishing rainment and the like.

Also disclosed is a method by which the instant inventive device can be manufactured.

THE INVENTION

Figure 1:
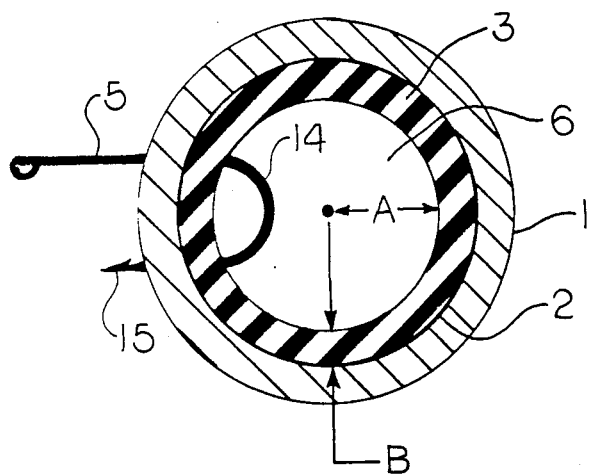
FIG. 1 is an end view of the device, on an enlarged scale, showing a hook at its bent end, inserted through the tubular casing through a elongated opening in the wall of the casing, and on through a slit in the wall of the elastomeric annulus, and on into the hollow of the elastomeric annulus.

With reference to FIG. 1, there is shown a side view of the device comprised of an outside tubular casing 1, an elastomeric annulus 3, a fishing hook 5 and a hollow 6 in the annulus 3. The outside tubular casing 1 can be constructed from metals such as aluminum, nickel, stainless steel, or it can also be constructed from thermoplastic polymers such as polyethylene, polyamides (nylons), polystyrene, polycarbonates, polymethylmethacrylate, cellulosics such as cellulose nitrate, cellulose acetate, polypropylene, and crosslinked polymers such as melamine resins, phenolics, epoxies, urethanes and polyolefins. Composites based on fiberglass, graphite, boron or aramid fibers with matrix binding materials such as epoxy, polyester, vinyl esters, phenolics and polyimides are especially preferred, the objective being to accommodate a low cost fabrication and at the same time, have a material that is relatively rigid so that when the device is fabricated, the tubular casing 1 can hold a compression on the elastomeric annulus, to be described infra. It has been determined by the inventor herein, that the rigidity of the tubular casing can be described by a Young's Modulus on the order of $2.4 \times 10^9$ dynes/cm$^2$, or higher.

The outside configuration of the tubular casing 1 is not critical, but the inside surface 2 of the tubular casing 1 is critical in that it must be generally circular-cylindrical in nature. That is, the interior of the tubular casing 1 must be a hollow circular tube. The reason for such a configuration is that the hollow circular tube configuration holds a triaxial compression on the elastomeric annulus 3 (to be described infra) which cases a greater hold on the lures that are being stored, such that under normal circumstances, the lures are held in the device much more securely.

Figure 2:
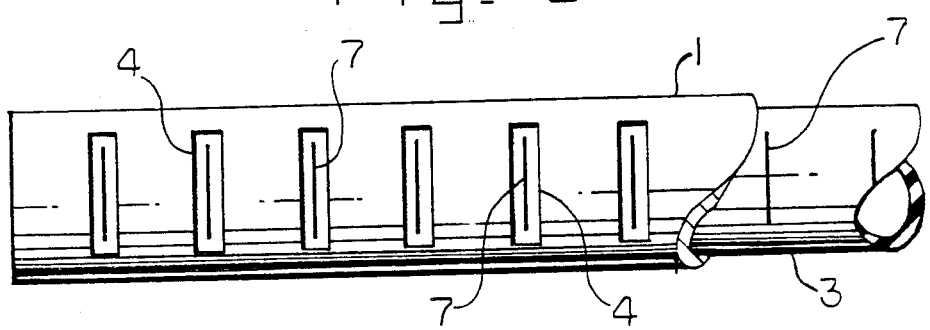
FIG. 2 is a side view of the device showing a cutaway portion of the outside tubular casing to expose the underlying elastomeric annulus with slits in its walls.

With reference to FIG. 2, it can be observed that the tubular casing 1 has spaced, essentially vertical, elongated openings 4 through its walls, which allow any object inserted therethrough to penetrate through the annulus 3 thereunder. It has been discoverd by the inventor herein, that such elongated openings 4 need to be essentially vertical, with respect to the long axis (central axis) of the tubular casing 1, in order for the device herein to perform at its optimum. Thus, the elongated openings 4 should not be aligned more than about 10 degrees from the vertical for best performance, and it is preferred for this invention to have the elongated openings 4 essentially vertical. The elongated openings 4 are elongated in the vertical direction and have lengths which approximate an arc length measured on the outer surface of the annulus resulting from an angle of between 50 degrees and 230 degrees, or more preferably from an angle of between 100 degrees and 200 degrees. This angle is measured from two lines connecting the central axis and the ends of the elongated opening. The openings have approximate widths in the range of 2 to 6 times larger than the diameter of the wire used in the bend 14 of the hooks 5 of the lures which are stored in the device. The number of such elongated openings 4 in the wall of the device is not critical except to note that there should be enough distance between the openings to accommodate the bulk of the lures being stored in the device, and therefore, the average distance between the openings in the device should range between about 0.5 to about 3.0 centimeters. Preferred for this invention is a distance in the range of 0.7 to 1.0 centimeters. It is contemplated by the inventor herein that the openings do not have to be in a single row as illustrated in FIG. 2, but instead can be in several rows, or the openings can be staggered along the linear axis of the tubular casing 1.

Encased in the tubular casing 1, is the hollow cylindrical elastomeric annulus 3, as is shown in FIGS. 1 & 2.

The elastomeric annulus must have the hollow 6 in order for the inventive device to operate at its maximum level. The radius (measured from the central axis to the inside surface of the annulus) of the opening which forms the hollow 6 of the elastomeric annulus 3 is designated as A, and the thickness of the wall of the elastomeric annulus is designated B, and for purposes of this invention the ratio of A/B should be in the range of about 10 to 0.1. The preferred range of A/B is in the range of 6 to 1.

The hollow annulus 3 has vertical slits 7 through its walls (FIG. 2), which align with the elongated openings 4 through the walls of the tubular casing 1. The arc length of the slits 7 should be nearly analogous to the arc length of the elongated openings 4. The preferred arc length of the slit on the inside should result from an angle of between 45 degrees to 210 degrees measured at the arc length on the outer surface of the annulus 3.

The overall size of the device when used to hold fishing lures is approximately on the order of 0.15 to 2 centimeters in a radius measured from the central axis to the outside surface of the casing. Preferred for this inventive device is an overall radius of about 0.2 to 1.0 centimeters.

The elastomeric annulus 3 can be fashioned from any resilient elastomeric material having a low permanent set. The resilient elastomeric material useful in this invention cannot be a foamed material because it does not have a low enough permanent set or compressive strength to hold the hooks, or the integrity to withstand the continued abrasion due to the repeated insertion of the hooks. Preferably, the annulus material has the physical properties of natural rubber or cis-1,4-isoprene -as described in "Physical Testing of Rubbers". Scott. J. R., Palmerton Publishing Co. Inc., New York, N.Y., 1965.

One of the critical factors regarding this invention, is the fact that the device must be manufactured such that the hollow cylindrical elastomeric annulus 3 is slightly compressed by the tubular casing 1. What is meant by "slight" compression, for purposes of this invention, is the amount of triaxial compression caused by the compression of the elastomeric annulus to decrease the size of the annulus to a size constituting from about 80% to about 99% of its original relaxed configuration. The annulus thus is under a circumferential compression and also under compression in the direction of the central axis. Since the annulus and the inside surface of tubular casing are circular-cylindrical, the annulus does not buckle to release the triaxial compression. When a hook bend 14 is inserted through a vertical slit, the wall of the annulus does not buckle and the hook 5 is held tightly. However. if the slits are but parallel to the long axis, insertion of a hook bend causes buckling. In this case, a hook is not held securely and if the hook barb 15 extends into the hollow 6 of the annulus, attempted removal of the hook tends to drive the point of the hook into the buckled annulus wall. This small amount of triaxial compression, in conjunction with the hollow 6 of the annulus 3, the circular-cylindrical geometry and the vertical slits are the four critical factors that allow this invention to have the benefits not found in the prior art devices.

In use, when it is desired to use the inventive device to hold lures, the fisherman simply inserts a hook of the lure, bend first, into one of the elongated openings of the device, pushing the bend of the hook through the elongated opening and on through the slit in the elastomeric annulus such that the bend of the hook extends into the hollow of the elastomeric annulus.

The inventive device will not snare hooks nor will the slits of the elastomeric annulus wear to the point that there will not be a positive grip on the hook that has been inserted. Thus, a main feature of this device is the ease with which the hooks of the lures can be inserted and withdrawn and another feature of the device is that the hooks, once inserted, are held so firmly that they will not become dislodged unless taken from the elongated opening by the fisherman.

Another embodiment of this invention is a case 8 (FIG. 3) containing one or more of the inventive devices, the whole constituting a convenient mode of carrying and storing the devices of the instant invention.

Figure 3:
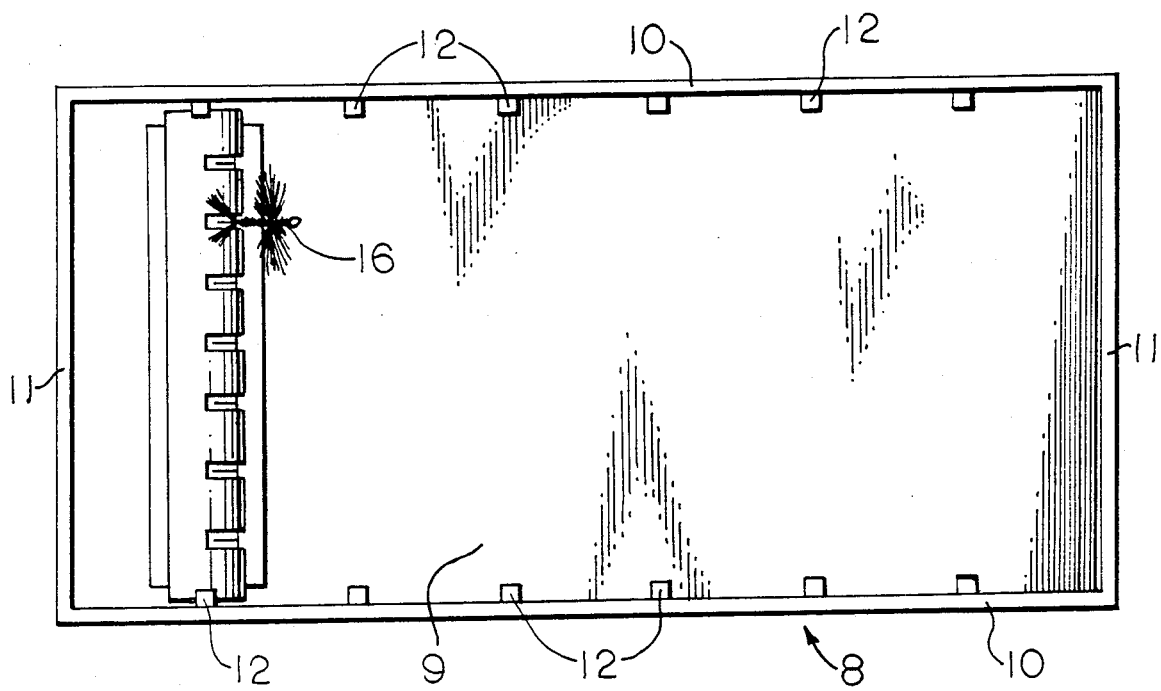
FIG. 3 is a top view of the case, showing a device of the invention situated therein containing an artificial fly.
Figure 4:
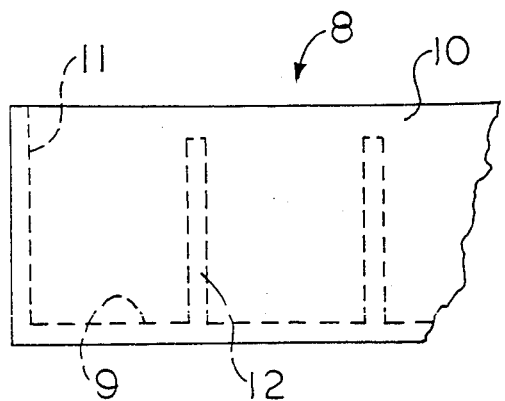
FIG. 4 is a side view of the case of FIG. 4, showing the position of the posts contained therein, in phantom.

In one preferred embodiment of such a case 8, there is shown in FIG. 3, a top view of a case having a bottom 9, side walls 10, end walls 11, and a top that is not shown herein. Situated vertically and spaced along both side walls 10, in positions directly opposite each other are posts 12, having a vertical height essentially equivalent to the height of the side walls 10, as is shown in phantom in FIG. 4 (which figure is an outside side view of the case showing one of the side walls 10). The remainder of the dimensions of the posts 12 are dictated by the size of the vertical cut 13 (shown in FIG. 5) in each end of the inventive device, which vertical cuts 13 will be described infra.

Figure 6:
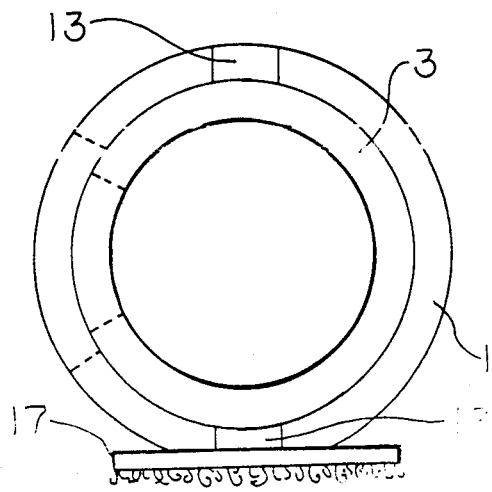
FIG. 6 is an end view of the device showing an attaching means for the device.
Figure 5:
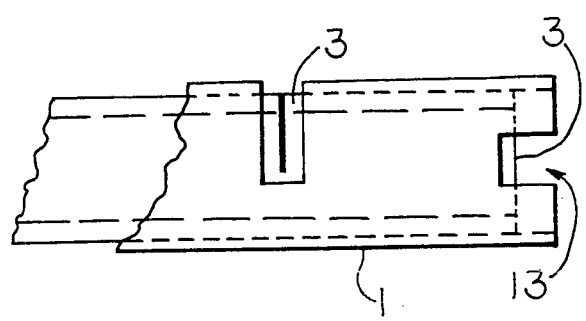
FIG. 5 is a top view of a portion of the device, showing an end having a vertical cut. Also shown is the elastomeric annulus in phantom.

FIG. 5, shows a top view of a portion of a device, showing the tubular casing 1, and essentially in phantom, the elastomeric annulus 3. There is also shown the vertical cut 13. The vertical cut 13 has dimensions equivalent to the overall dimensions of the posts 12, described supra. When the device is placed in the case 8, such that the vertical cuts 13 slide down over the posts 12, the elastomeric annulus 3, which extends or protrudes slightly into the vertical cut 13, is compressed to the extent that there is a back pressure from the elastomeric annulus 3 against the posts 12 which causes the device to firmly hold against the posts 12, thereby allowing the device to stay firmly held in the case 8. The pressure from the compressed elastomeric annulus is not such that the device cannot be easily gripped by the fisherman and removed from the case. The compressability of the elastomeric annulus 3 is also not so great that the fisherman cannot easily slip the device back into the case to be firmly held. In some cases, while fishing, it is convenient to adhere the lure holding device to a fishing vest. The means to accomplish this is shown in FIG. 6 which illustrates an end view of the device showing the tubular casing 1, slightly flattened on one surface, and showing the annulus 3. Attached to the device on the outside surface of the tubular casing 1, is a small piece of Velcro ® shown as 17. The device containing the lures may be removed from the case and then attached to a fishing vest by pressing the Velcro strip against a second piece of Velcro which has been sewn on the fishing vest. After use, the holding device may be returned to the case wherein the Velcro is compressed, but does not adhere to the case bottom.

The inventive device may be manufactured by using numerous approaches. For example, the elongated openings may be cut into the outer structure followed by insertion of the elastomeric annulus. The elastomeric annulus may be installed in the tubular casing by elongating the elastomeric annulus temporarily to decrease the diameter of the elastomeric annulus while inserting it in the tubular casing, and then relaxing the elongation, which causes the elastomeric annulus to regain its original diameter and causing a slight compression on the elastomeric annulus.

Adhesives may be used to bind the elastomeric annulus to the interior of the tubular casing, the adhesives first acting as a lubricant during the fabrication of the device, and then acting as a coupling agent to bind the elastomeric annulus to the interior surface of the tubular casing. After inserting, the elastomeric annulus is slightly compressed from end to end to make sure that the elastomeric annulus is under triaxial compression, and then the adhesive is allowed to dry. Thereafter, the slits may be cut in the elastomeric annulus and, if desired, the vertical cuts in the tubular casing may be cut at this time. Preferably, if the device is going to be encased using the compression of the instant invention, the vertical cuts in the tubular casing are made prior to the insertion of the elastomeric annulus.

Although the major use of this inventive device has been described for the storage of fishing lures, it will be evident to those skilled in the art that it has utility over and above the use for storing fishing lures.

What is claimed is:

1. A device for holding and storing fishing lures comprising in combination
   (i) a tubular casing having a circular-cylindrical inside surface;
   (ii) a hollow cylindrical elastomeric annulus contained and engaged by said tubular casing and held under a slight triaxial compression by said tubular casing;
   (iii) said tubular casing having, with respect to the long axis of the tubular casing, essentially vertical elongated openings through its walls and, said elastomeric annulus having slits corresponding to and aligned with said elongated openings.

2. A case for holding and storing fishing lures comprising in combination, a case, and detachedly fixed therein at least one device of claim 1.

3. A case for holding and storing fishing lures, comprising in combination a case, and detachedly fixed therein at least one device; said case comprising in combination,
   (a) a bottom, fixedly attached to two opposing side walls, said bottom further fixedly attached to two opposing end walls, said side walls and said end walls fixedly attached to each other in a boxed relationship;
   (b) a series of opposing posts attached to the inside of the said side walls in a spaced relationship, said posts having vertical heights essentially equivalent to the height of the side walls;
said device comprising in combination,
   (i) a tubular casing having a circular-cylindrical inside surface;
   (ii) a hollow cylindrical elastomeric annulus contained and engaged by said tubular casing and held under a slight triaxial compression by said tubular casing;
   (iii) said tubular casing having, with respect to the long axis of the tubular casing, essentially vertical elongated openings through its walls and, said elastomeric annulus having slits corresponding to and aligned with said elongated openings;
   (iv) said tubular casing having vertical cuts in both of its ends;
at least one device detachedly fixed between two of the vertical posts, wherein the vertical cuts of the tubular casing are aligned and mesh with oppositely aligned vertical posts, whereby the elastomeric annulus is compressed.

* * * * *